United States Patent
Sonoda et al.

(10) Patent No.: US 7,522,246 B2
(45) Date of Patent: Apr. 21, 2009

(54) LIQUID CRYSTAL DISPLAY DEVICE WITH ONE PIXEL ELECTRODE HAVING A PLURALITY OF GENERALLY CIRCULAR PATTERNS IN EACH PIXEL REGION

(75) Inventors: Hidehiro Sonoda, Mobara (JP); Junji Tanno, Mobara (JP)

(73) Assignee: Hitachi Displays, Ltd., Chiba (JP)

( * ) Notice: Subject to any disclaimer, the term of this patent is extended or adjusted under 35 U.S.C. 154(b) by 205 days.

(21) Appl. No.: 11/785,707

(22) Filed: Apr. 19, 2007

(65) Prior Publication Data
US 2007/0195253 A1    Aug. 23, 2007

Related U.S. Application Data

(63) Continuation of application No. 10/720,307, filed on Nov. 25, 2003, now Pat. No. 7,212,271.

(30) Foreign Application Priority Data
Nov. 28, 2002    (JP) .............................. 2002-345728

(51) Int. Cl.
*G02F 1/1337* (2006.01)
*G02F 1/1343* (2006.01)
(52) U.S. Cl. .................. 349/146; 349/129; 349/143
(58) Field of Classification Search ................. 349/143, 349/146, 129
See application file for complete search history.

(56) References Cited

U.S. PATENT DOCUMENTS

| 5,646,705 | A | * | 7/1997 | Higuchi et al. .............. 349/143 |
| 6,141,124 | A | | 10/2000 | Suzuki et al. |
| 6,384,889 | B1 | | 5/2002 | Miyachi et al. |
| 6,504,592 | B1 | * | 1/2003 | Takatori et al. ............. 349/129 |

(Continued)

FOREIGN PATENT DOCUMENTS

CN    1359025 A    8/2001

(Continued)

OTHER PUBLICATIONS

JPO Office Action dated Jan. 8, 2008, in Japanese.

*Primary Examiner*—David Nelms
*Assistant Examiner*—Nathanael Briggs
(74) *Attorney, Agent, or Firm*—Reed Smith LLP; Juan Carlos A. Marquez, Esq.

(57) ABSTRACT

A liquid crystal display device comprising electrodes of the one side formed on the pixel regions on the surface of one of the substrates arranged facing each other with the liquid crystals interposed therebetween and on the side of the liquid crystals, and electrodes of the other side formed on at least the pixel regions on the surface of the other substrate on the side of the liquid crystals, wherein each electrode of the one side has a shape of a plurality of circular patterns or patterns close to circles that are arranged in contact with each other, whereby a region where the electrode of the one side is not formed is surrounded by the circular patterns or patterns close to circles of an odd number of three or more, and projections are formed on the surface of the other substrate on the side of the liquid crystals at portions facing nearly the centers of the circular patterns or the patterns close to circles.

5 Claims, 12 Drawing Sheets

U.S. PATENT DOCUMENTS

| | | |
|---|---|---|
| 6,710,825 B2 | 3/2004 | Kubo et al. |
| 6,842,212 B2 | 1/2005 | Kressmann et al. |
| 6,862,062 B2 * | 3/2005 | Kubo et al. ................. 349/129 |
| 6,894,752 B2 | 5/2005 | Okada et al. |
| 6,924,856 B2 * | 8/2005 | Okumura et al. .............. 349/96 |
| 7,006,180 B2 | 2/2006 | Suzuki et al. |
| 2003/0053020 A1 | 3/2003 | Okada et al. |

FOREIGN PATENT DOCUMENTS

| | | |
|---|---|---|
| JP | 11-211912 | 10/1998 |
| JP | 2002-229046 | 1/2001 |
| JP | 2002-202511 | 9/2001 |

* cited by examiner

FIG. 12

LIQUID CRYSTAL DISPLAY DEVICE WITH ONE PIXEL ELECTRODE HAVING A PLURALITY OF GENERALLY CIRCULAR PATTERNS IN EACH PIXEL REGION

CROSS-REFERENCE TO RELATED APPLICATIONS

This application is a Continuation of U.S. application Ser. No. 10/720,307 filed on Nov. 25, 2003 now U.S. Pat. No. 7,212,271. Priority is claimed based on U.S. application Ser. No. 10/720,307 filed on Nov. 25, 2003, which claims priority to Japanese Patent Application No. 2002-345728 filed on Nov. 28, 2002, all of which is incorporated by reference.

BACKGROUND OF THE INVENTION

1. Field of the Invention
This invention relates to a liquid crystal display device.
2. Description of the Related Art
Among various kinds of liquid crystal display devices, there has been known the one in which there are formed pixel electrodes of a transparent conducting layer on pixel regions of one of the substrates that are facing each other with the liquid crystals interposed therebetween and on the side of the liquid crystals, and the light transmission factor of the liquid crystals is controlled by the electric field generated among the electrodes, the liquid crystal molecules being oriented perpendicularly to the substrate when there is applied no electric field.

In order to obtain wide visual field characteristics in the thus constituted liquid crystal display device, there has been known the one in which each pixel electrode is divided into a plurality of regions to form electrodes (hereinafter referred to as sub-pixels), and projections are formed on the surface of the substrate of the side on where the opposing electrodes are formed on the side of the liquid crystals at positions where they are facing the centers of the sub-pixels (see, for example, JP-A-2000-47217 (patent literature 1)).

When an electric field is generated between the pixel electrodes and the opposing electrodes, the liquid crystal molecules on the sub-pixels so behave as to radially fall with the projections as centers, and light passing through the liquid crystals are emitted to the observers over a wide range.

In the thus constituted liquid crystal display device, however, each pixel electrode has been formed by a set of a plurality of sub-pixels obtained by dividing the pixel electrode. Therefore, there are inevitably formed regions without electrode among one sub-pixel and other sub-pixels surrounding the above one sub-pixel.

This means that there is formed a region where the liquid crystals are not driven in each pixel region, imposing limitation on improving the so-called numerical aperture of the pixels.

SUMMARY OF THE INVENTION

This invention was accomplished in view of the above circumstances, and its object is to provide a liquid crystal display device improving the numerical aperture of the pixels.

Briefly described below are representative examples of the invention disclosed in this application.

A liquid crystal display device according to an embodiment of the invention comprises:

electrodes of the one side formed on the pixel regions on the surface of one of the substrates arranged facing each other with the liquid crystals interposed therebetween and on the side of the liquid crystals, and electrodes of the other side formed on at least the pixel regions on the surface of the other substrate on the side of the liquid crystals; wherein each electrode of the one side has a shape of a plurality of circular patterns or patterns close to circles that are arranged in contact with each other, whereby a region where the electrode of the one side is not formed is surrounded by the plurality of circular patterns or patterns close to circles of an odd number of three or more; and projections are formed on the surface of the other substrate on the side of the liquid crystals at portions facing nearly the centers of the circular patterns or the patterns close to circles.

A liquid crystal display device according to another embodiment of the invention comprises:

pixel electrodes formed on the pixel regions on the surface of one of the substrates arranged facing each other with the liquid crystals interposed therebetween and on the side of the liquid crystals, and opposing electrodes formed on at least the pixel regions on the surface of the other substrate on the side of the liquid crystals; wherein the pixel electrodes are such that groups of patterns in which a plurality of circular patterns or patterns close to circles are neighboring each other in one direction, are arranged neighboring each other in a direction at right angles with the above one direction, the patterns in one group of patterns being deviated by a half pitch from the patterns of the other neighboring groups of patterns, and the patterns being in contact with each other at their contours; and projections are formed on the surface of the other substrate on the side of the liquid crystals at portions facing nearly the centers of the circular patterns or the patterns close to circles.

A liquid crystal display device according to a further embodiment of the invention comprises:

electrodes of the one side formed on one of the substrates arranged facing each other with the liquid crystals interposed therebetween, and electrodes of the other side formed on the other substrate; wherein each electrode of the one side has a shape in which a plurality of circular patterns or patterns close to circles are arranged being electrically connected together; and projections are formed on the other substrate at portions facing the circular patterns or the patterns close to circles.

In a liquid crystal display device of the above embodiments, further, there are formed a plurality of gate signal lines in parallel and a plurality of drain signal lines in parallel intersecting the gate signal lines on the surface of one of the substrates on the side of the liquid crystals, the regions surrounded by the gate signal lines and the drain signal lines serving as pixel regions;

the pixel electrodes are arranged on the pixel regions together with the switching elements that are driven by scanning signals from the gate signal lines, so that video signals are fed from the drain signal lines through the switching elements; and among the circular patterns or the patterns close to circles of the pixel electrodes, the circular patterns or the patterns close to circles near the drain signal lines or the gate signal lines are so deformed as to possess a side that goes along the side of the drain signal lines or of the gate signal lines at portions near the drain signal lines or the gate signal lines.

The invention is in no way limited to the above embodiments only but can be modified in a variety of ways without departing from the technical spirit of the invention.

DETAILED DESCRIPTION OF THE INVENTION

Embodiments of the liquid crystal display device according to the invention will now be described with reference to the drawings.

Embodiment 1

<Whole Constitution>

Figure 2A:
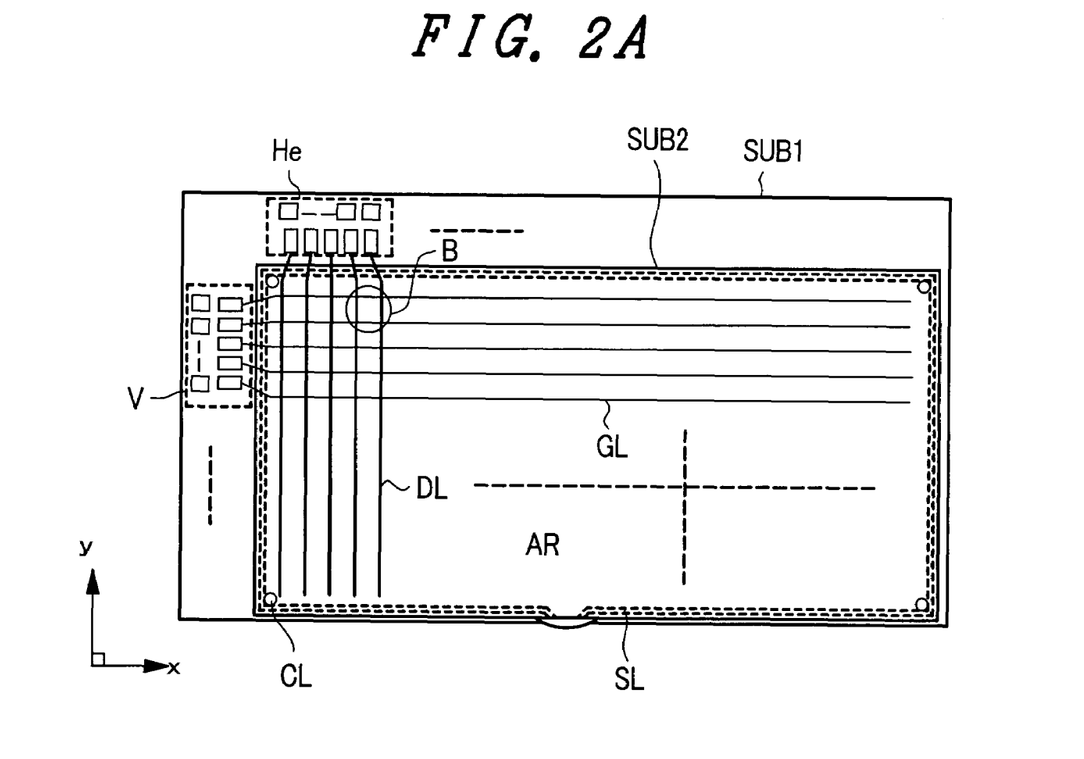
FIGS. 2A-2B are plan and inset circuit views illustrating the whole constitution of the liquid crystal display device according to the embodiment of this invention.
Figure 2B:
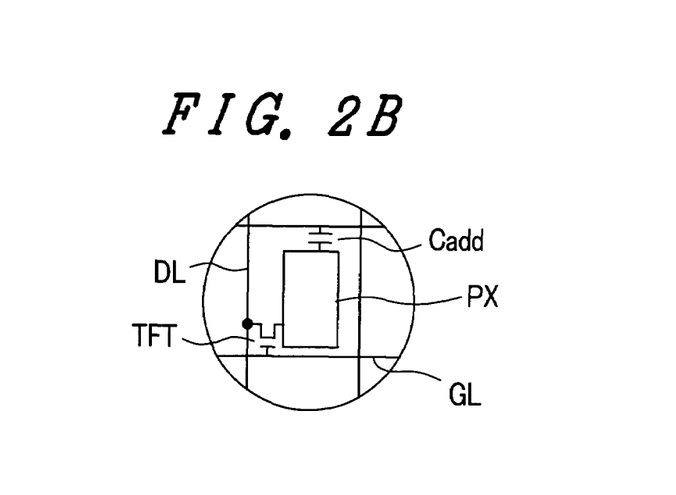

FIGS. 2A-2B are plan and inset circuit views illustrating a liquid crystal display device according to an embodiment of the invention.

In FIG. 2A, there are arranged a pair of transparent substrates SUB1 and SUB2 being opposed to each other with the liquid crystals interposed therebetween, the liquid crystals being sealed between the one transparent substrate SUB1 and the other transparent substrate SUB2 and surrounded by a sealing member SL. The sealing member also plays the role of securing the transparent substrate SUB1 and the transparent substrate SUB2 together.

On the surface of the one transparent substrate SUB1 on the side of the liquid crystals surrounded by the sealing member SL, there are formed gate signal lines GL extending in the x-direction and arranged in parallel in the y-direction, and drain signal lines DL extending in the y-direction and arranged in parallel in the x-direction.

The regions surrounded by the gate signal lines GL and the drain signal lines DL constitute pixel regions, and a set of matrix of these pixel regions constitute a liquid crystal display portion AR.

In each pixel region as shown in FIG. 2B, there are formed a thin-film transistor TFT operated by a scanning signal from a gate signal line GL of the one side, and a pixel electrode PX to which is supplied a video signal from a drain signal line DL of one side through the thin-film transistor TFT.

The pixel electrode PX generates an electric field relative to an opposing electrode CT (not shown) formed in common on the pixel regions on the surface of the other transparent substrate SUB2 on the side of the liquid crystals. The light transmission factor of the liquid crystals is controlled relying upon the electric field.

An additional capacitor element Cadd is formed between the pixel electrode PX and the other gate signal line GL arranged neighboring the gate signal line GL which is for driving the thin-film transistor TFT in the pixel region. The additional capacitor element Cadd is provided so that a video signal fed to the pixel electrode PX is held by the pixel electrode PX.

The opposing electrode CT is drawn to the surface on the side of the transparent substrate SUB1 via conductors CL formed at four corners of the sealing member SL.

The ends on one side of the gate signal lines GL are extending beyond the sealing member SL, and the extended ends are constituting terminals to which will be connected the output terminals of a scanning signal drive circuit V. The input terminals of the scanning signal drive circuit V receive signals from a printed board (not shown) arranged outside the liquid crystal display panel.

The scanning signal drive circuit V is constituted by a plurality of semiconductor devices, wherein a plurality of gate signal lines GL neighboring to each other are classified into groups, and a semiconductor device is allocated to each group.

Similarly, the ends on one side of the drain signal lines DL are extending beyond the sealing member SL, and the extended ends are constituting terminals to which will be connected the output terminals of a video signal drive circuit He. The input terminals of the video signal drive circuit He receive signals from a printed board (not shown) arranged outside the liquid crystal display panel.

The video signal drive circuit He, too, is constituted by a plurality of semiconductor devices, wherein a plurality of drain signal lines DL neighboring to each other are classified into groups, and a semiconductor device is allocated to each group.

The gate signal lines GL are successively selected by the scanning signals from the scanning signal drive circuit V.

Further, the drain signal lines DL are supplied with video signals from the video signal drive circuit He at timings for selecting the gate signal lines GL.

The above embodiment deals with a semiconductor device having the scanning signal drive circuit V and the video signal drive circuit He that are mounted on the transparent substrate SUB1. However, the semiconductor device may be the one of a so-called tape-carrier type connecting across, for example, the transparent substrate SUB1 and the printed board. Or, when the semiconductor layer of the thin-film transistor TFT is made of polycrystalline silicon (p-Si), the semiconductor may be such that the semiconductor elements of polycrystalline silicon are formed on the surface of the transparent substrate SUB1 together with the wiring layer.

<Constitution of the Pixels>

Figure 1A:
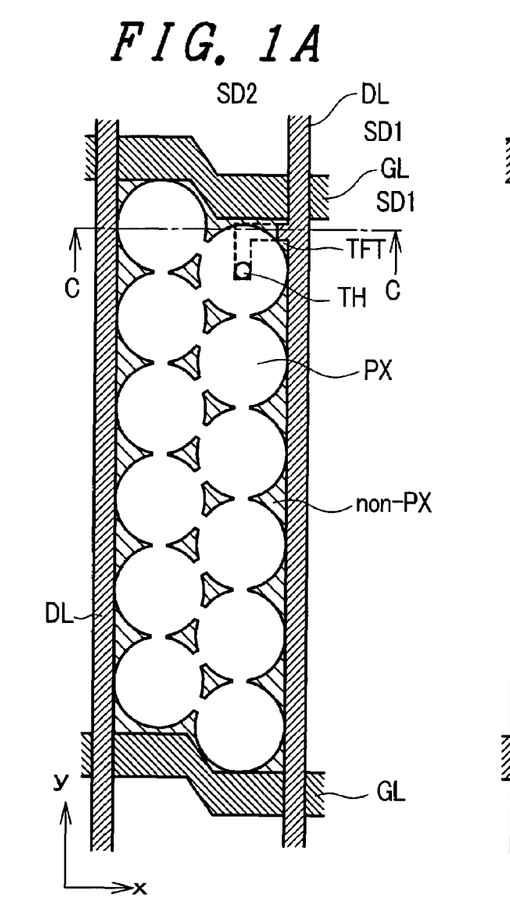
FIGS. 1A-1C are plan and cross-sectional views illustrating the constitution of an a pixel in a liquid crystal display device according to an embodiment of this invention.
Figure 1B:
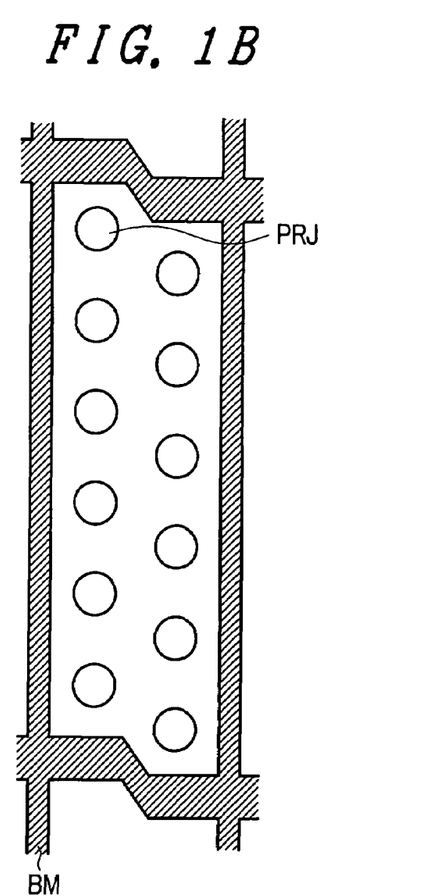
Figure 1C:
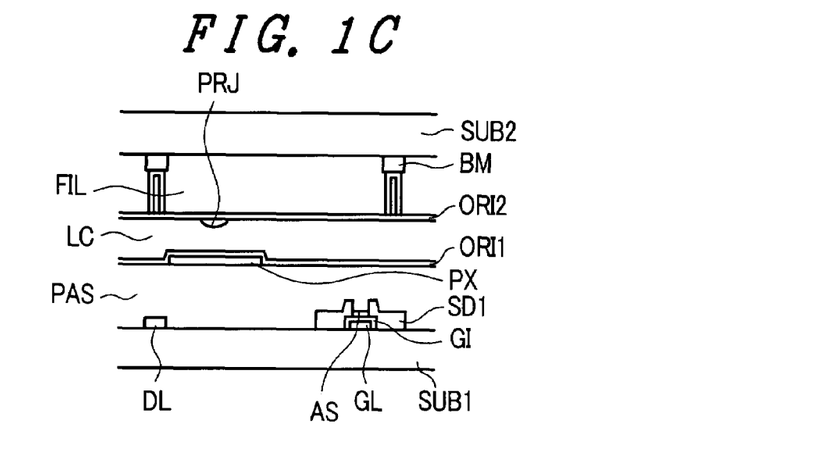

FIGS. 1A-1C are elan and cross-sectional views illustrating the constitution of a pixel according to an embodiment, wherein FIG. 1A is a plan view of the transparent substrate SUB1 on the side of the liquid crystals, FIG. 1B is a plan view of the transparent substrate SUB2 on the side of the liquid crystals, and FIG. 1C is a sectional view along the line c-c in FIG. 1A. The plan view of FIG. 1B is the one that is viewed from the side of the observer.

In FIG. 1A, first, on the surface of the transparent substrate SUB1 on the side of the liquid crystals, there are formed a pair of gate signal lines GL extending in the x-direction and arranged in the y-direction.

These gate signal lines GL surround a rectangular region together with a pair of drain signal lines DL that will be described later, and this region constitutes a pixel region.

On the surface of the transparent substrate SUB1 on which the gate signal lines GL are formed, there is formed an insulating film GI of, for example, SiN covering the gate signal lines GL.

The insulating film GI works as an interlayer insulating film for the gate signal lines GL in a region where the drain signal lines DL are formed as will be described later, works as a gate-insulating film in the region where the thin-film transistor TFT is formed as will be described later, and works as a dielectric film in the region where the capacitor element Cadd is formed as will be described later.

A semiconductor layer AS of amorphous silicon is formed on the surface of the insulating film GI so as to be overlapped on the extending portions of the gate signal lines GL.

The semiconductor layer AS is that of the thin-film transistor TFT. Upon forming a drain electrode SD1 and a source electrode SD2 on the surface thereof, there can be constituted a MIS transistor of an inversely staggered structure with the extended portion of the gate signal line GL as a gate electrode.

Here, the drain electrode SD1 and the source electrode SD2 are simultaneously formed at the time of forming the drain signal lines DL.

Namely, there are formed drain signal lines DL extending in the y-direction and arranged in the x-direction, the drain signal lines partly extending up to the upper surface of the semiconductor layer AS to form a drain electrode SD1 and, further, to form a source electrode SD2 which is separated from the drain electrode SD1 by a channel length of the thin-film transistor TFT.

The source electrode SD2 slightly extends from the surface of the semiconductor layer up to the upper surface of the insulating film on the side of the pixel region, and is brought into contact with a pixel electrode PX that will be described later via a through-hole TH.

A protection film PAS of a low-dielectric insulating film such as of resin is formed on the surface of the transparent substrate SUB1 on which are formed the thin-film transistor TFT, drain signal line DL, drain electrode SD1 and source electrode SD2. The protection film PAS works to avoid a direct contact between the thin-film transistor TFT and the liquid crystals, and prevents the characteristics of the thin-film transistor TFT from being deteriorated.

A pixel electrode PX is formed on the upper surface of the protection film. The pixel electrode PX is made of a light-transmitting electrically conducting film such as of ITO (indium tin oxide), ITZO (indium tin zinc oxide), IZO (indium zinc oxide), $SnO_2$ (tin oxide) or $In_2O_3$ (indium oxide).

The pixel electrode PX comprises a set of many electrodes (sub-pixels) of, for example, circular patterns.

Namely, the pixel electrode PX is constituted by the arrangement of a plurality of circular sub-pixels, the sub-pixels being electrically connected together due to a light-transmitting electrically conducting film formed having a relatively narrow width relative to other neighboring sub-pixels.

In other words, the pixel electrode PX is formed in a shape obtained by perforating a light-transmitting electrically conducting film flatly formed on most of the regions of the pixel region with many rhombic holes (the sides thereof are of an arcuate shape directed inward) arranged like a matrix.

Here, the sub-pixels in the groups of sub-pixels arranged in the y-direction are each positioned between the two sub-pixels of other groups of sub-pixels. Therefore, a region non-PX where no pixel electrode PX is formed is surrounded by the sub-pixels of an odd number of three.

Further, a sub-pixel may be electrically connected to other sub-pixels neighboring thereto, the connection thereof may be the contact based on the shape of the patterns or may be accomplished by using a relatively narrow connection member (e.g., connection member formed integrally with the conductor layer of the sub-pixels).

When the pixel electrode PX is formed by arranging the sub-pixels as described above, it is allowed to arrange many sub-pixels in a limited area and, hence, to increase the numerical aperture of the pixel.

The pixel electrode PX is partly and electrically connected to the source electrode SD2 of the thin-film transistor TFT through a contact portion CT formed in a portion of the protection film PAS.

On the upper surface of the transparent substrate SUB1 on which the pixel electrodes PX are formed as described above, there is formed an orientation film ORI1 covering the pixel electrodes PX. The orientation film ORI1 comes into direct contact with the liquid crystals. Though there is no need of particularly orienting the liquid crystals in the initial state, there may be employed a perpendicularly oriented film in which the direction of initial orientation of the liquid crystal molecules has been determined in advance, or an ordinary orientation film may be oriented by rubbing, as required. In the following embodiments, the initial orientation is determined by using the orientation film, to which only, however, the invention is in no way limited.

First, a black matrix BM is formed on the surface of the transparent substrate SUB2 on the side of the liquid crystals to sectionalize the pixel regions. Namely, the black matrix BM has a pattern in which openings are formed in the pixel regions leaving the peripheral portions (inclusive of a portion covering the thin-film transistor TFT) thereby to improve the contrast of display while avoiding deterioration in the characteristics of the thin-film transistor TFT.

On the surface of the transparent substrate SUB2 on which the black matrix BM is formed, there is formed a color filter FIL covering the openings of the black matrix BM. The color filter FIL comprises filters of various colors such as red (R), green (G) and blue (B). The filter of, for example, red color is formed in common for the groups of pixel regions arranged in parallel in the y-direction, and the filters of red (R), green (G), blue (B), red (R), - - - are formed in common for the groups of pixel regions that are neighboring in the x-direction.

An orientation film ORI2 is formed covering the black matrix BM and the color filter FIL. The orientation film ORI2 comes into direct contact with the liquid crystals, and determines the direction of initial orientation of the liquid crystal molecules.

Figure 3:
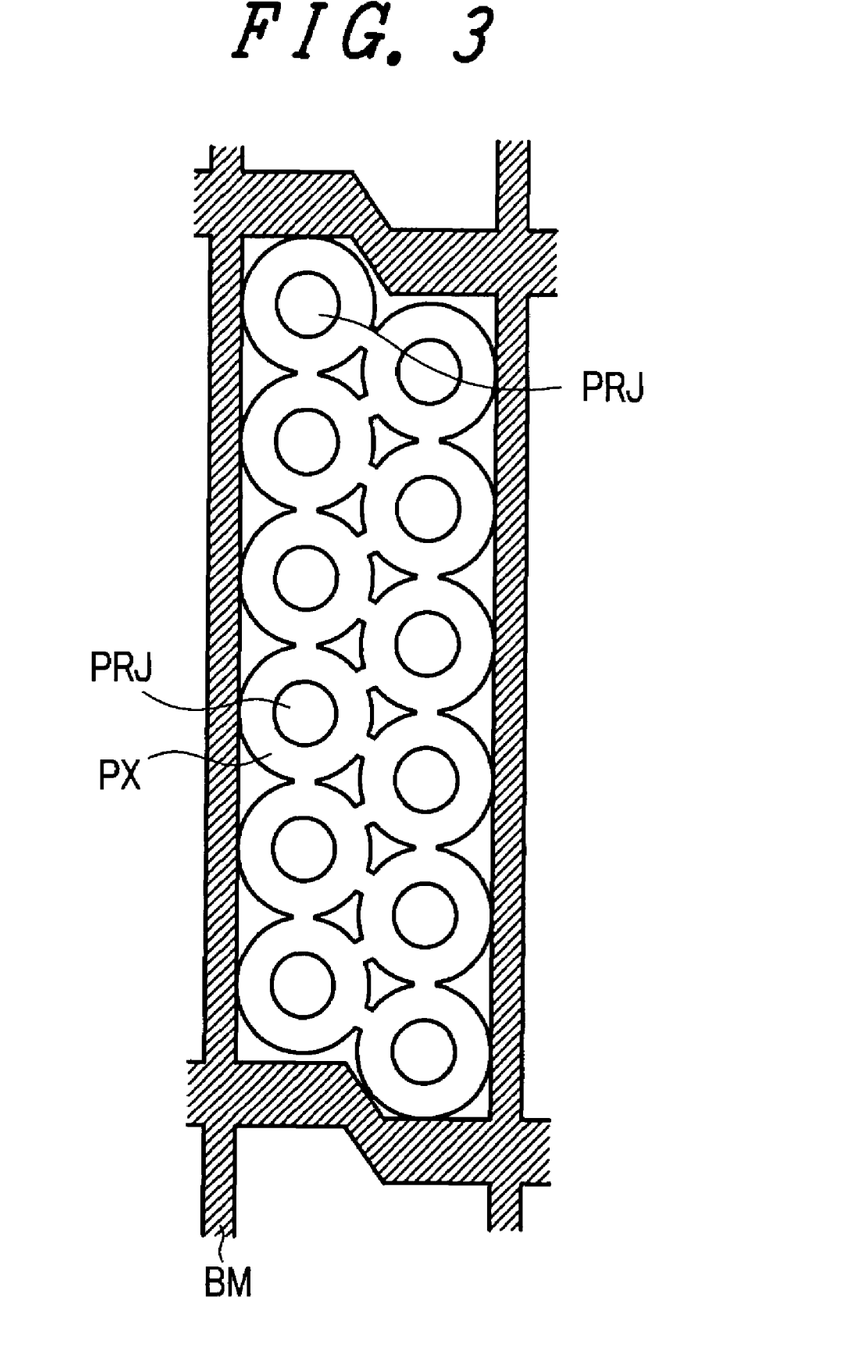
FIG. 3 is a plan view illustrating a positional relationship between the projections and the pixel electrode (sub-pixels) of a pixel in the liquid crystal display device of the invention.

On the upper surface of the orientation film ORI2, there are further formed projections PRJ of, for example, a resin being opposed to the centers of the sub-pixels of the pixel electrodes PX. FIGS. 3A-3C illustrate a positional relationship between the sub-pixels of the pixel electrode PX on the side of the transparent substrate SUB1 and the projections PRJ on the side of the transparent substrate SUB2. However, the projections PRJ need not necessarily be correctly positioned at the centers of sub-pixels of the pixel electrode PX but may be slightly deviated to exhibit the effect that will be described later. The projections may simply be protruded and may assume various shapes such as a semi-circular shape, a polygonal conical shape or a rugged shape.

In this constitution, the liquid crystals have, for example, a negative dielectric anisotropy, and are oriented nearly perpendicularly to the transparent substrate SUB1 when no electric field is applied. When an electric field is applied, the liquid crystal molecules fall in parallel with the substrate and fall radially with the projections PRJ as centers.

Accordingly, light is emitted over a wide angle to reach the observer's eyes passing through the liquid crystals, and so-called wide visual field characteristics are obtained.

According to the liquid crystal display device described above, each pixel PX is constituted by a plurality of sub-pixels, and the numerical aperture of the pixel is improved by the arrangement of the sub-pixels.

Embodiment 2

Figure 4A:
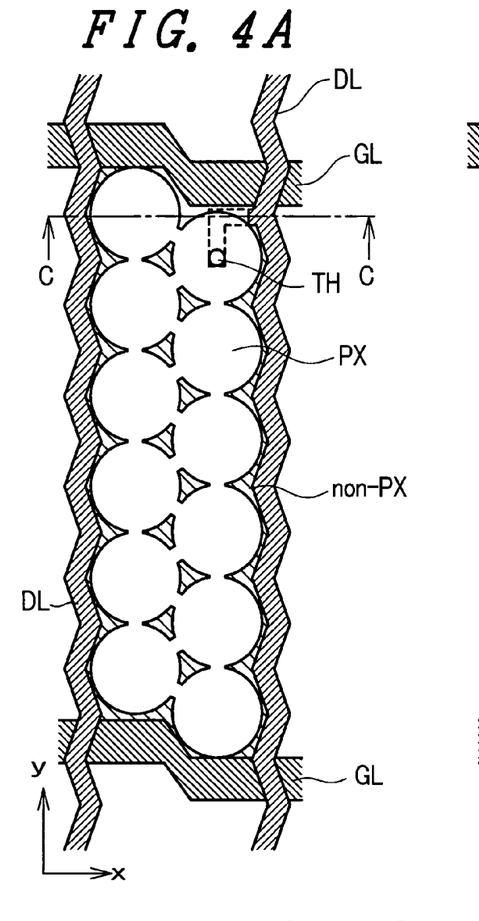
FIGS. 4A-4C are plan and cross-sectional views illustrating the constitution of the pixel in the liquid crystal display device according to another embodiment of this invention.
Figure 4B:
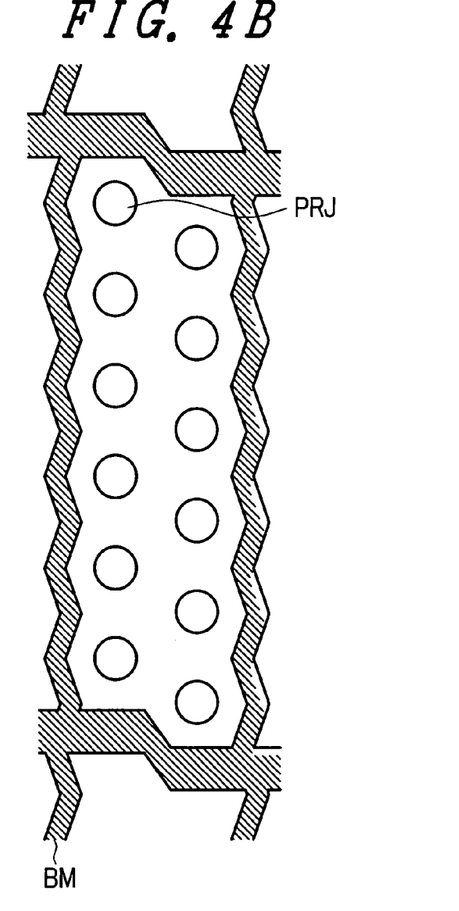
Figure 4C:
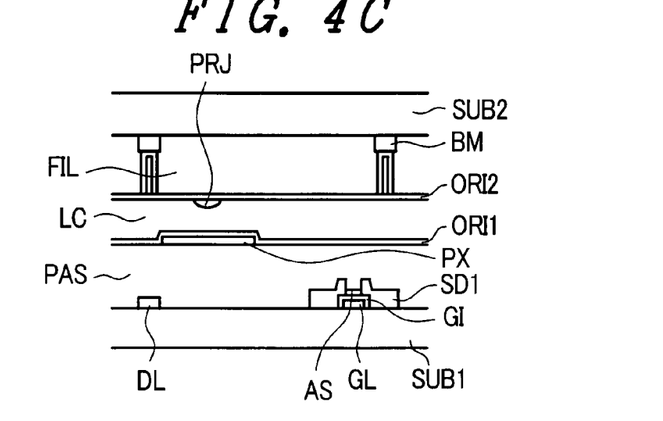

FIGS. 4A-4C are plan and cross-sectional views illustrating the constitution of the liquid crystal display device according to another embodiment of this invention, and corresponds to FIGS. 1A-1C.

As compared to the case of FIGS. 1A-1C, this embodiment is different in the constitution of the drain signal lines DL. That is, as for the circular pattern of the pixel electrode PX arranged close to the drain signal lines DL, useless gap is formed between the circular pattern and another circular pattern arranged neighboring thereto in the y-direction, and this gap is filled with the drain signal lines DL. Therefore, the drain signal lines DL assume a zig-zag shape.

In other words, the pixel electrode PX has a shape in which a plurality of circular patterns are arranged in contact with each other, and the drain signal lines DL are formed roughly along the envelope thereof.

According to this constitution, wasteful region is eliminated in the pixel region, and the numerical aperture of the pixel is further improved.

In this case, further, the color filter FIL may be formed in a zig-zag shape like the drain signal lines DL. The numerical aperture is thus improved. Because of the same reason, further, the black matrix BM may be formed in a zig-zag shape like the drain signal lines DL.

Embodiment 3

Figure 5A:
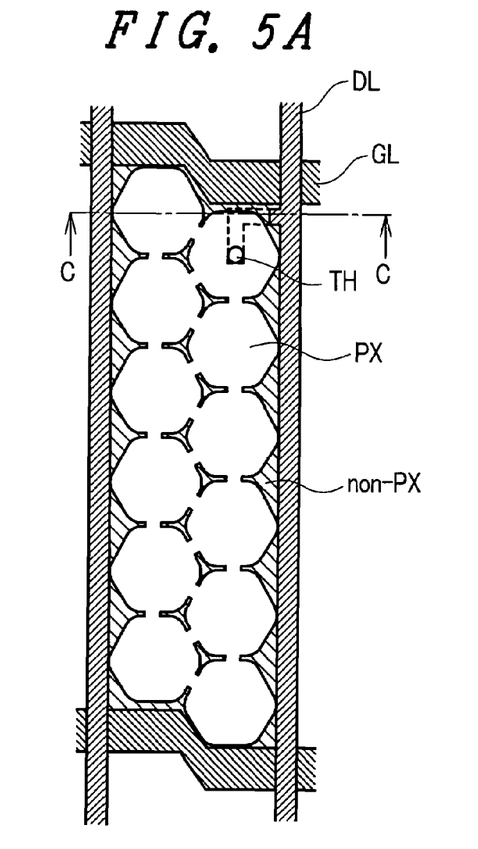
FIGS. 5A-5C are plan and cross-sectional views illustrating the constitution of the pixel in the liquid crystal display device according to a further embodiment of this invention.
Figure 5B:
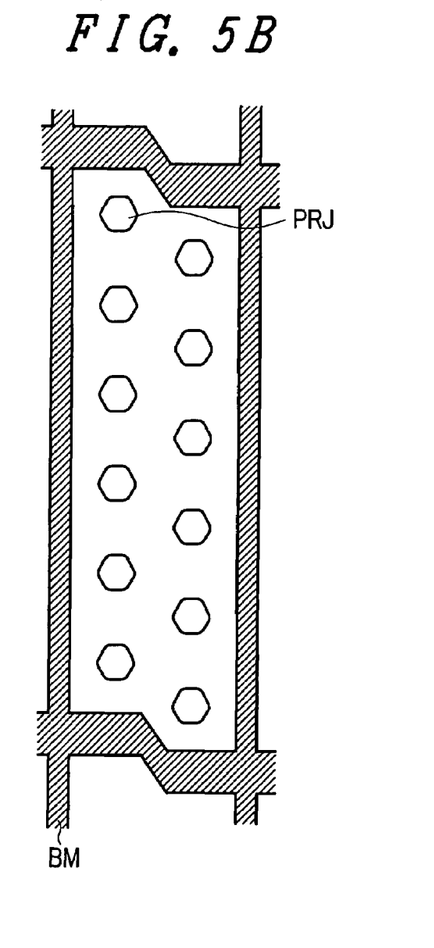
Figure 5C:
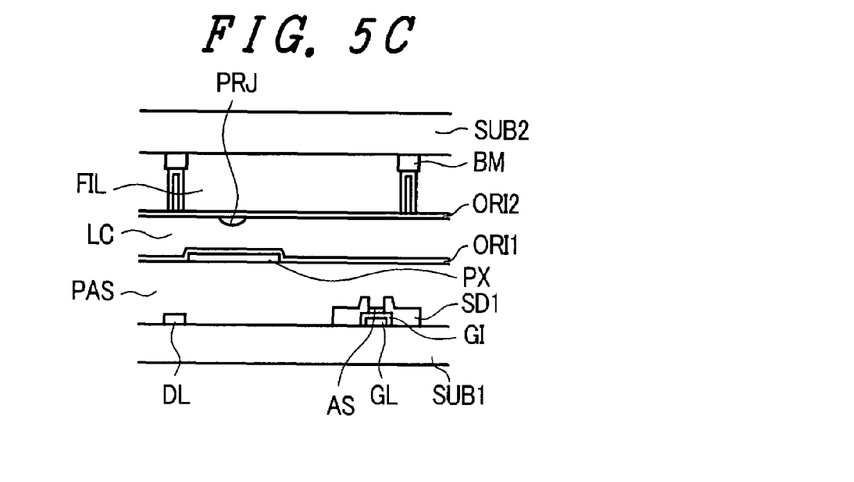

FIGS. 5A-5C are plan and cross-sectional views illustrating the constitution of the liquid crystal display device according to a further embodiment of this invention, and corresponds to FIGS. 1A-1C.

As compared to the case of FIGS. 1A-1C, this embodiment is different in the pattern of the pixel electrode PX. That is, a plurality of patterns (sub-pixels) arranged in contact with each other are of a hexagonal shape or of a shape close thereto.

The hexagonal shape is a pattern close to a circle. Even when thus formed, the liquid crystal molecules so behave as to radially fall from the centers of the patterns. Therefore, the pattern needs not necessarily be limited to the hexagonal shape only but may be a polygonal shape such as a pentagonal shape or a shape having more corners. Or, the pattern may have rounded corners.

In this case, it is desired that the projections PRJ on the side of the transparent substrate SUB2 have a shape similar to the above pattern, though the invention is not limited thereto only.

Embodiment 4

Figure 6A:
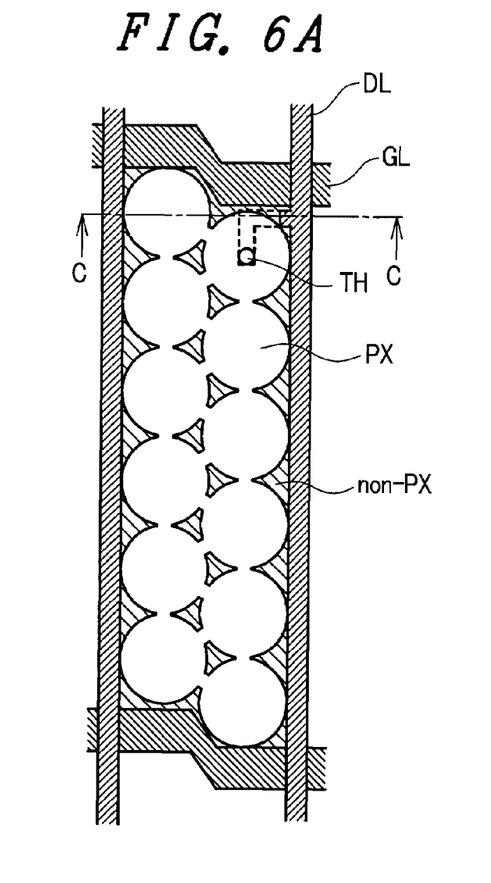
FIGS. 6A-6C are plan and cross-sectional views illustrating the constitution of the pixel in the liquid crystal display device according to a still further embodiment of this invention.
Figure 6B:
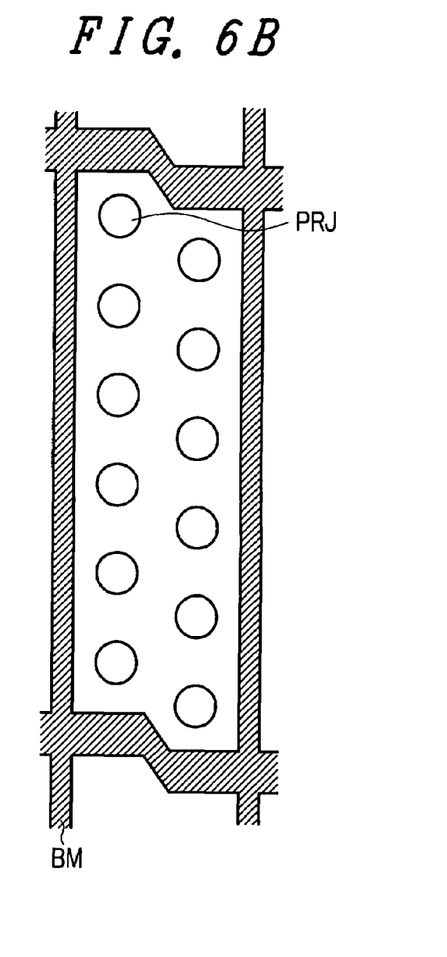
Figure 6C:
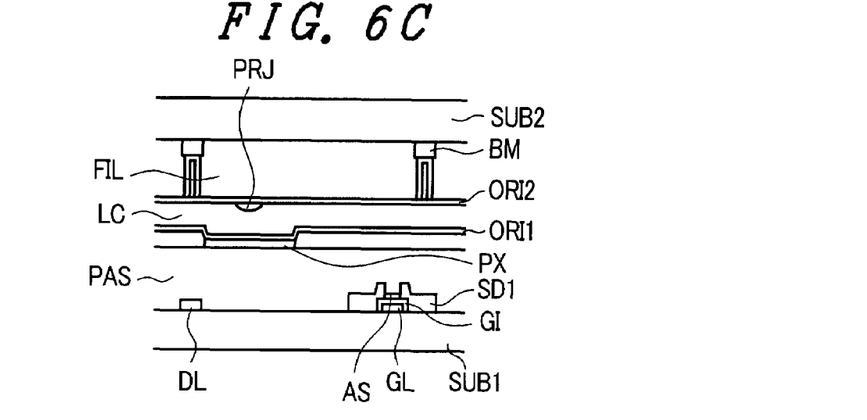

FIGS. 6A-6C are plan and cross-sectional views illustrating the constitution of the liquid crystal display device according to a still further embodiment of this invention, and corresponds to FIGS. 1A-1C.

As compared to the case of FIGS. 1A-1C, this embodiment is different in that, as shown in FIG. 6C, a layer PSV of the same material as, for example, the protection film PAS is formed around the pixel electrode PX formed on the upper surface of the protection film PAS. By forming the layer PSV, the surface of the layer PSV is nearly rendered to be in flush with the surface of the pixel electrode PX.

On the surface of the transparent substrate SUB1 on which the pixel electrodes PX are formed, an orientation film ORI1 is formed covering the pixel electrodes PX avoiding a decrease in the reliability of the orientation film ORI1 caused by a step created by the pixel electrodes PX.

The pixel electrode PX has a shape as described above, and its contour has a relatively large circumferential length. Namely, this embodiment reliably eliminates inconvenience caused by the step in the periphery.

Embodiment 5

Figure 7A:
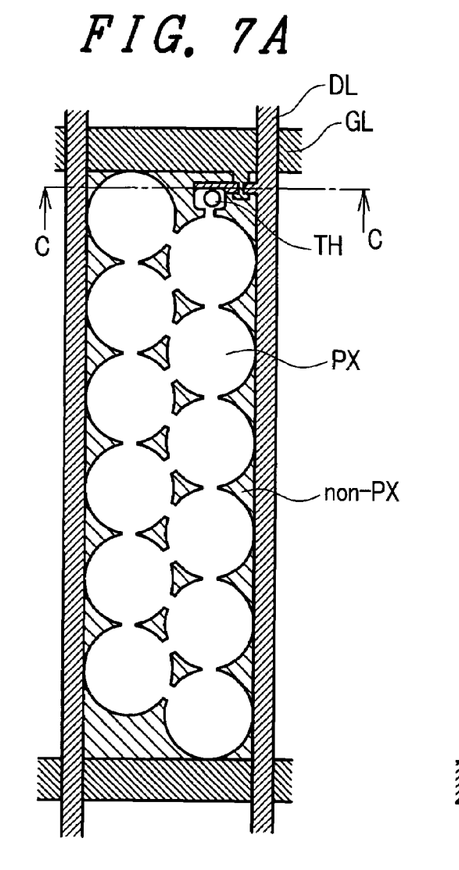
FIGS. 7A-7C are plan and cross-sectional views illustrating the constitution of the pixel in the liquid crystal display device according to a yet further embodiment of this invention.
Figure 7B:
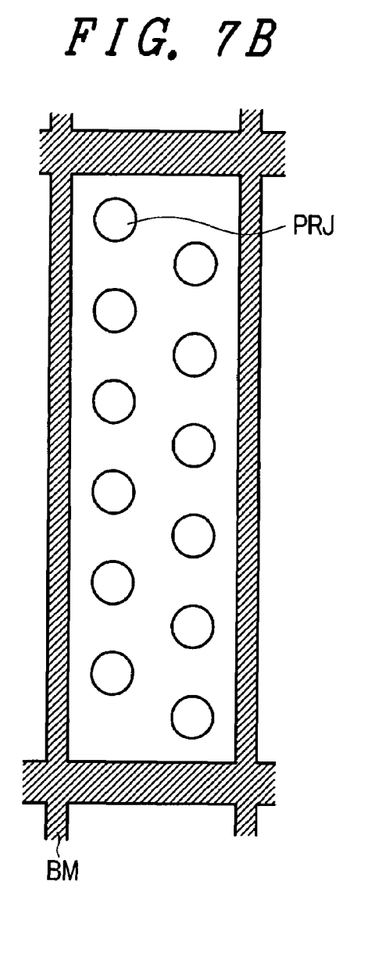
Figure 7C:
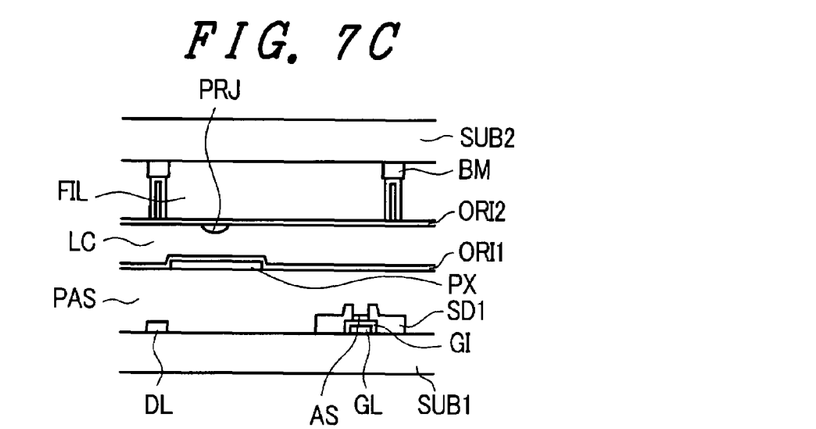

FIGS. 7A-7C are plan and cross-sectional views illustrating the constitution of the liquid crystal display device according to a yet further embodiment of this invention, and corresponds to FIGS. 1A-1C.

As compared to the case of FIGS. 1A-1C, this embodiment is different in the constitution of the gate signal lines GL. In this embodiment, the gate signal lines GL are formed straight.

A sufficiently large numerical aperture is obtained by the constitution in which a plurality of, for example, circular patterns are arranged close to each other, though the so-called numerical aperture of the pixel is slightly smaller than that of the case of FIGS. 1A-1C.

Embodiment 6

Figure 8A:
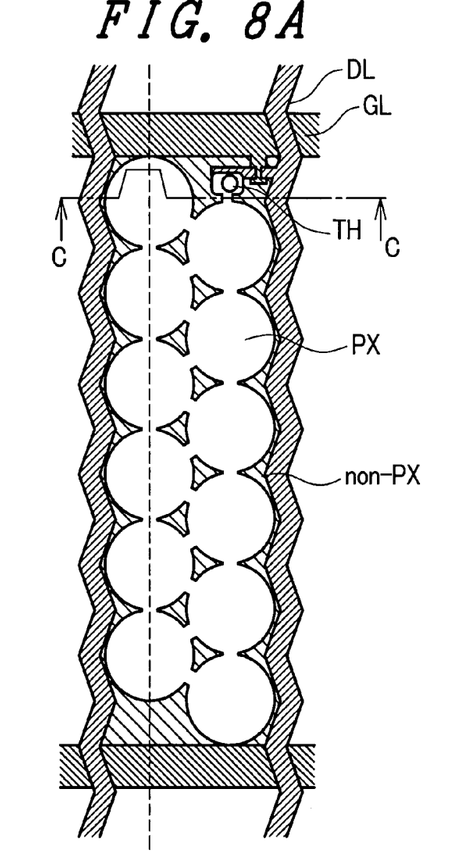
FIGS. 8A-8C are plan and cross-sectional views illustrating the constitution of the pixel in the liquid crystal display device according to a further embodiment of this invention.
Figure 8B:
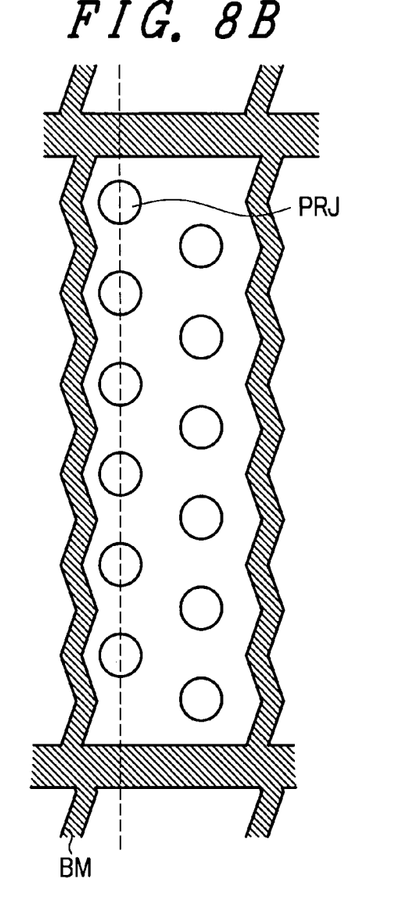
Figure 8C:
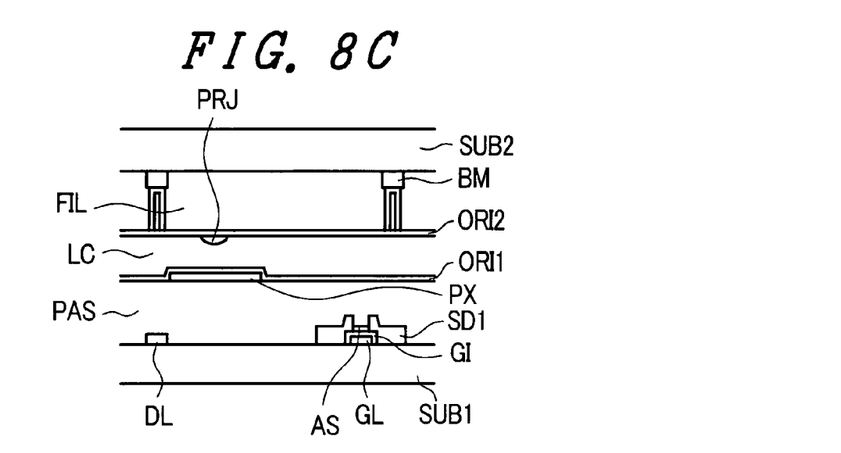

FIGS. 8A-8C are plan and cross-sectional views illustrating the constitution of the liquid crystal display device according to a further embodiment of this invention, and corresponds to FIGS. 4A-4C.

As compared to the case of FIGS. 4A-4C, this embodiment is different in the constitution of the gate signal lines GL. In this embodiment, the gate signal lines GL are formed straight.

Embodiment 7

Figure 9A:
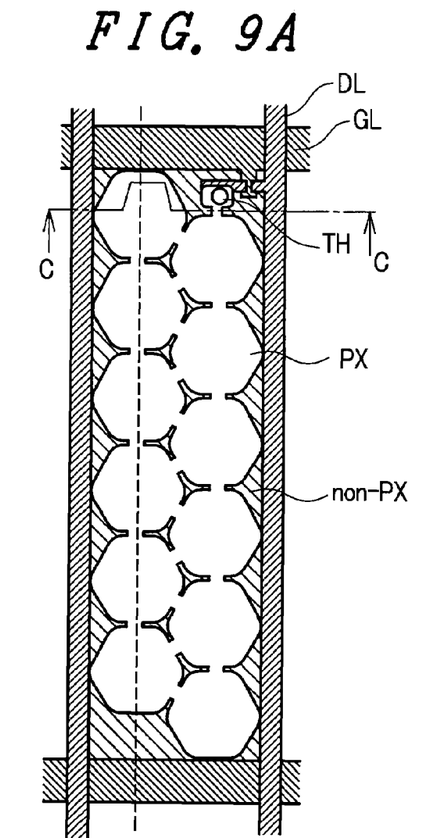
FIGS. 9A-9C are plan and cross-sectional views illustrating the constitution of the pixel in the liquid crystal display device according to a further embodiment of this invention.
Figure 9B:
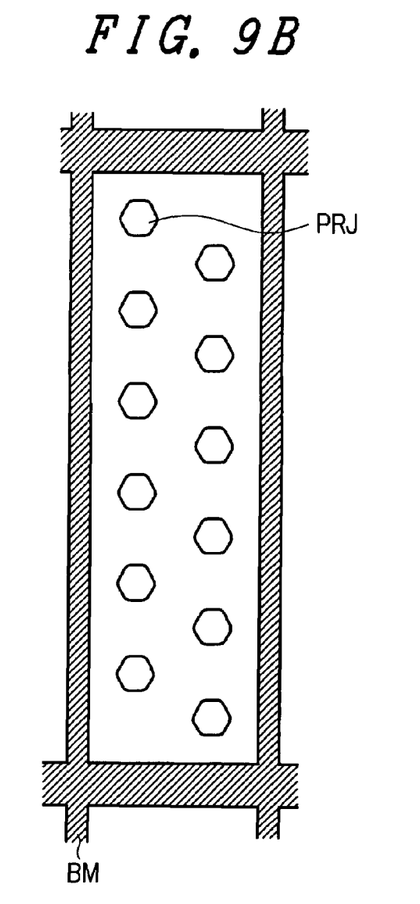
Figure 9C:
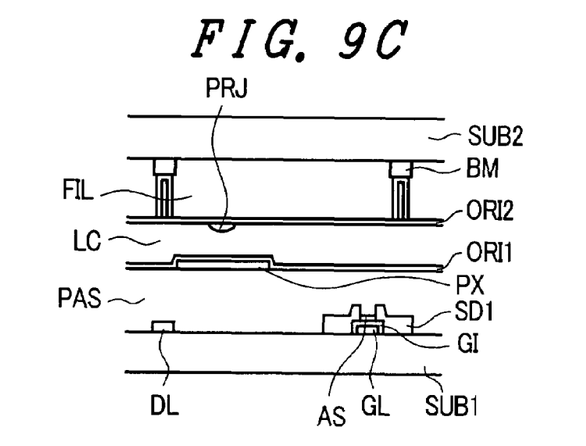

FIGS. 9A-9C are plan and cross-sectional views illustrating the constitution of the liquid crystal display device according to a further embodiment of this invention, and corresponds to FIGS. 5A-5C.

As compared to the case of FIGS. 5A-5C, this embodiment is different in the constitution of the gate signal lines GL. In this embodiment, the gate signal lines GL are formed straight.

Embodiment 8

Figure 10A:
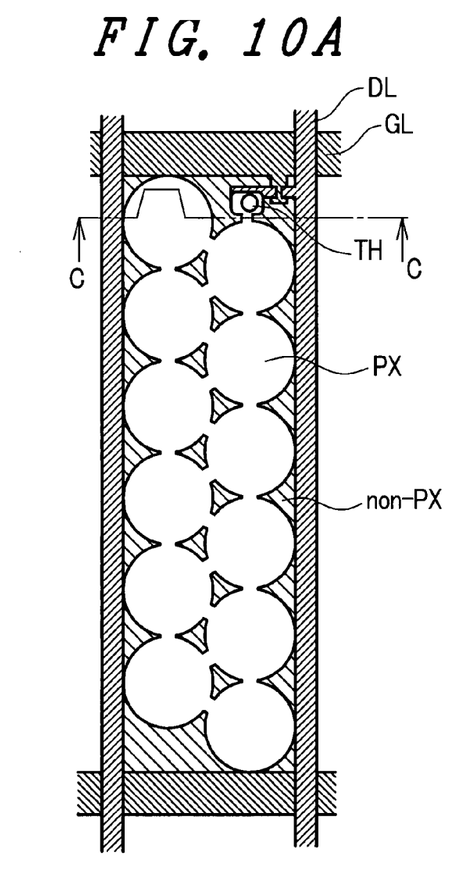
FIGS. 10A-10C are plan and cross-sectional views illustrating the constitution of the pixel in the liquid crystal display device according to a further embodiment of this invention.
Figure 10B:
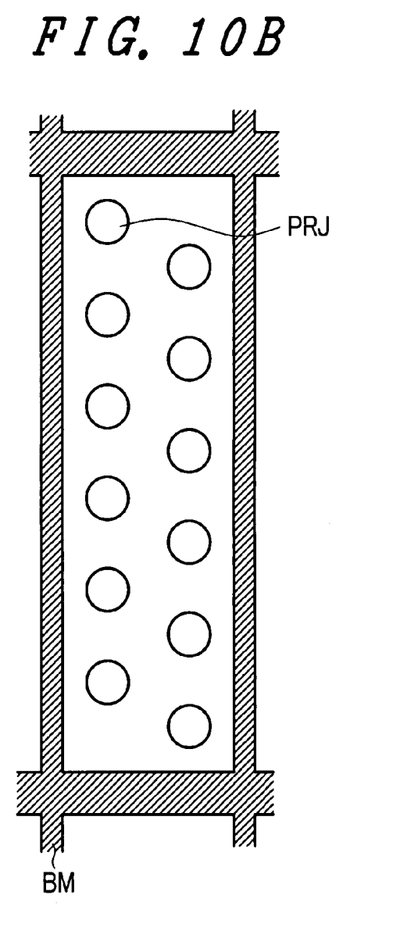
Figure 10C:
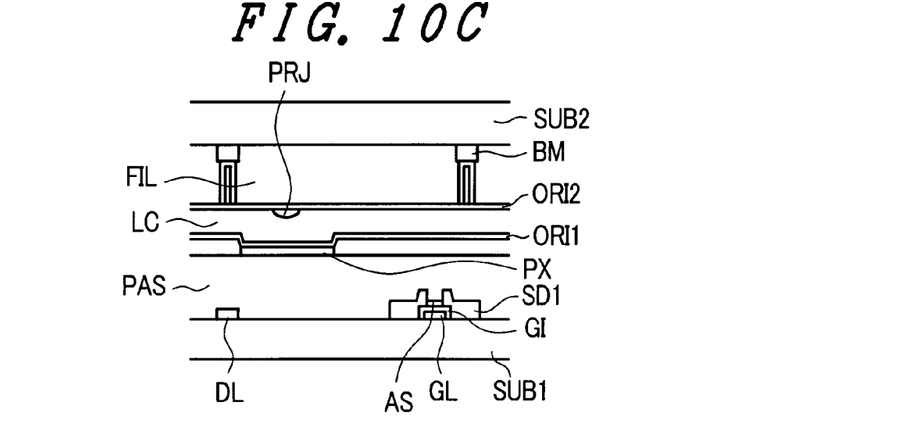

FIGS. 10A-10C are plan and cross-sectional views illustrating the constitution of the liquid crystal display device according to a further embodiment of this invention, and corresponds to FIGS. 6A-6C.

As compared to the case of FIGS. 6A-6C, this embodiment is different in the constitution of the gate signal lines GL. In this embodiment, the gate signal lines GL are formed straight.

Then, a layer PSV of the same material as, for example, the protection film PAS is formed around the pixel electrode PX formed on the upper surface of the protection film PAS. By forming the layer PSV, the surface of the layer PSV is nearly rendered to be in flush with the surface of the pixel electrode PX.

Embodiment 9

Figure 11:
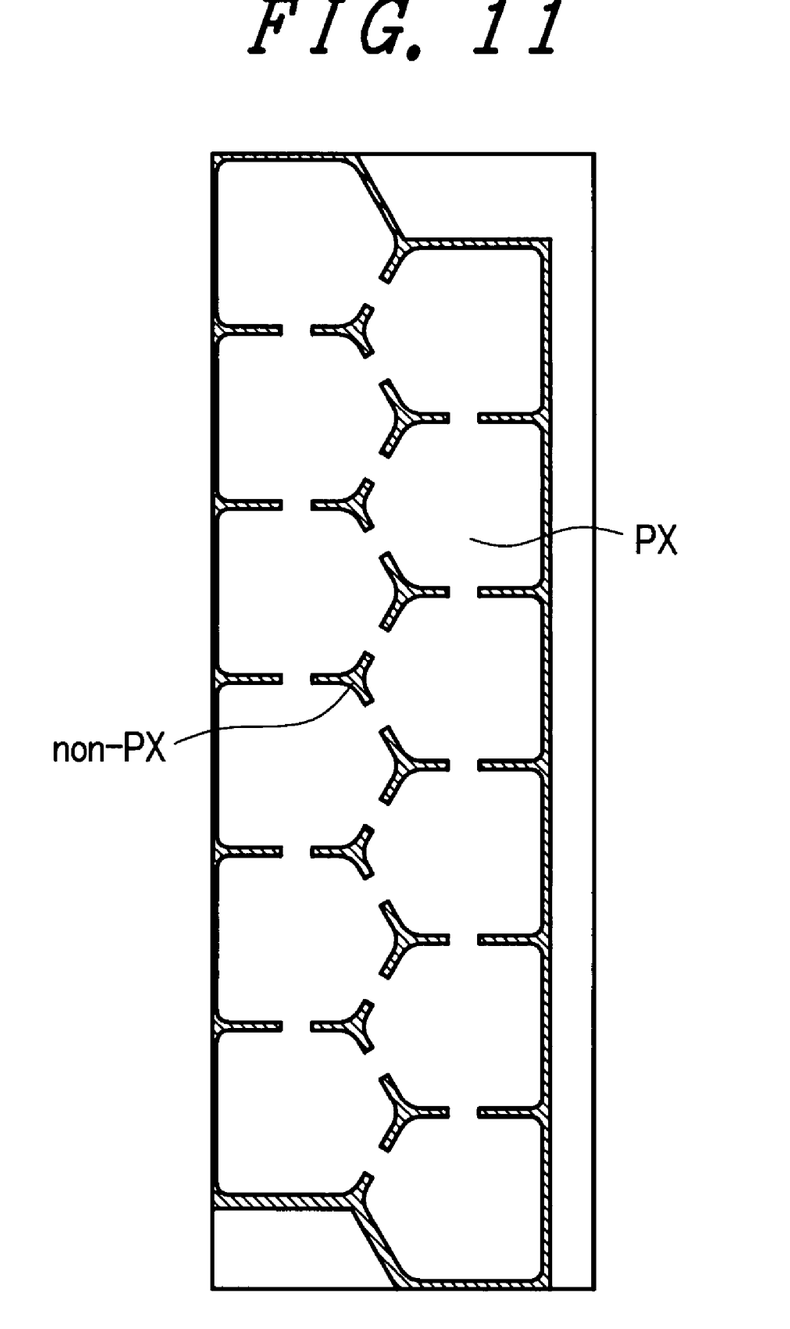
FIG. 11 is a view illustrating the constitution of the pixel in the liquid crystal display device according to another embodiment of this invention.

FIG. 11 is a view illustrating the constitution of the liquid crystal display device according to a further embodiment of the invention, and shows a pattern of the pixel electrode.

The patterns that are divided are not limited to circular ones or any other point-symmetrical figures, but may assume a shape that includes a linear portion at a portion close to, for example, the drain signal lines DL or the gate signal lines GL as shown in FIG. 11.

Of the circular patterns or patterns close to circles of the pixel electrodes PX, a circular pattern or a pattern close to the circle at a portion near the drain signal line DL or the gate signal line GL may be so deformed at a portion near the drain signal line DL or the gate signal line GL as to possess a side that goes along the drain signal line DL or the gate signal line GL to increase the numerical aperture of the pixels.

Embodiment 10

Figure 12:
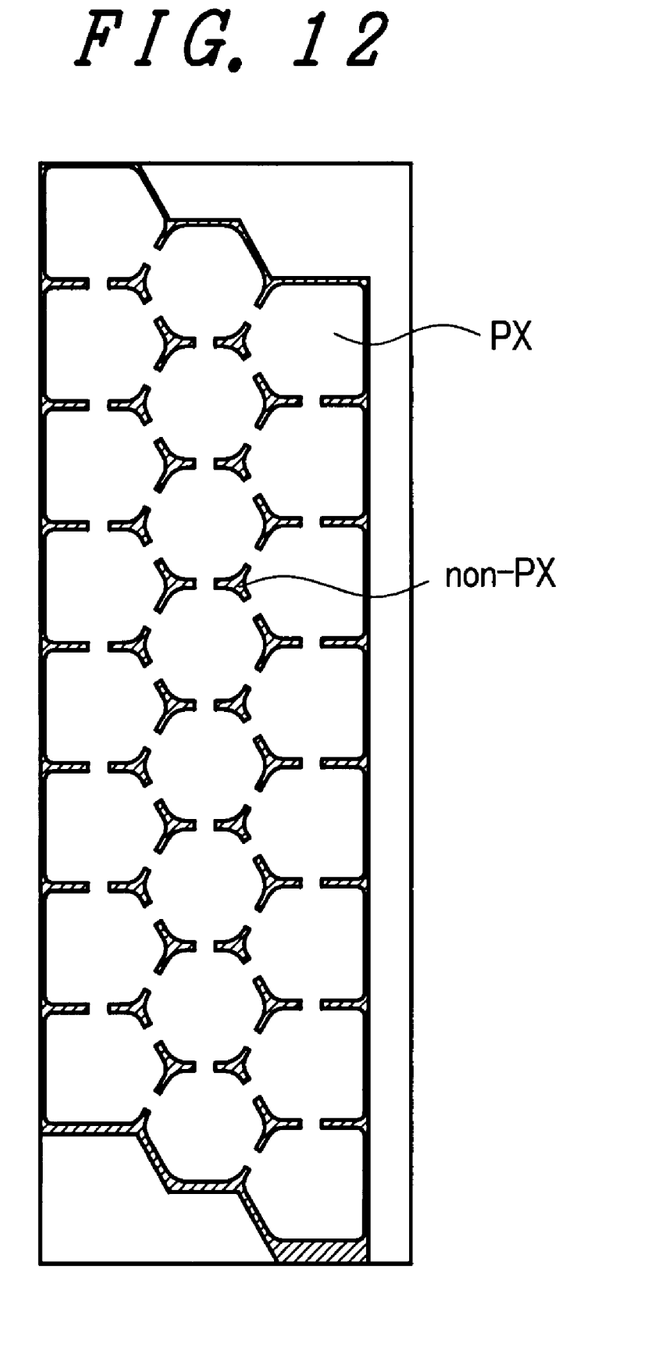
FIG. 12 is a view illustrating the constitution of the pixel in the liquid crystal display device according to a further embodiment of this invention.

FIG. 12 is a view illustrating the constitution of the liquid crystal display device according to a further embodiment of the invention, and shows a pattern of the pixel electrode. In FIG. 12, there are arranged, in the x-direction, three groups of patterns which are arranged in the y-direction. In these groups, the patterns have different shapes.

Concerning the shapes of the pixel electrodes PX described above, the region without the electrode was surrounded by three sub-pixels. Not being limited thereto only, however, the above region may be surrounded by the sub-pixels of an odd number of not smaller than 3 to further decrease the above region and to further improve the numerical aperture of the pixels.

In the above embodiments, further, each pixel electrode PX was formed by a plurality of sub-pixels. However, the opposing electrode may be constituted by a plurality of sub-pixels, too. In this case, the pixel electrode PX is constituted on nearly the whole pixel region. Then, on the upper surfaces thereof, there are formed projections PRJ at portions facing the centers of the sub-pixels of the opposing electrodes.

From the standpoint of liquid crystals, the pixel electrodes PX and the opposing electrodes CT are not particularly distinguished from each other, and the situation is the same even when either one of them is replaced by the other one.

According to the liquid crystal display device of this invention as will be obvious from the foregoing description, it is made possible to increase the numerical aperture of the pixels.

What is claimed is:

1. A liquid crystal display device comprising:
    a plurality of gate signal lines and a plurality of drain signal lines which are arranged on a surface of one of substrates arranged facing each other with liquid crystal interposed therebetween;
    a plurality of pixel regions which are defined by the gate signal lines and the drain signal lines;
    first electrodes which are formed on the pixel regions;
    second electrodes which are formed on a different substrate from the substrate in which the gate signal line was formed;
    wherein each of the first electrodes in each pixel region has a plurality of patterns that are circular or similar to circles, the patterns being in contact with each other in each of the pixel regions,
    wherein the patterns are connected to at least two other adjacent patterns, the patterns being formed as a pattern group in a pixel region and arranged along at least two straight lines with each other in the pixel region, each straight line of patterns being arranged at a gap of a half distance between patterns relative to the other straight line of patterns in the pixel region; and
    projections which are formed on the surface of the substrate in which the second electrodes are formed, a number of the projections of the pixel region is equal to a number of the patterns in the pixel region.

2. A liquid crystal display device according to claim 1, wherein each projection is arranged in a center of each pattern.

3. A liquid crystal display device according to claim 1, wherein the first electrodes are pixel electrodes, the second electrodes are opposing electrodes.

4. A liquid crystal display device according to claim 1, wherein the gate signal line in the pixel region is formed along a perimeter of the plurality of patterns and the gate signal line is nonlinear.

5. A liquid crystal display device according to claim 1, wherein the drain signal line in the pixel region is formed along a perimeter of the plurality of patterns and the gate signal line is nonlinear.

* * * * *